(12) United States Patent
Yates (10) Patent No.: US 6,380,270 B1
(45) Date of Patent: Apr. 30, 2002

(54) PHOTOGENERATED NANOPOROUS MATERIALS

(75) Inventor: Stephen F. Yates, Arlington Heights, IL (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/671,022

(22) Filed: Sep. 26, 2000

(51) Int. Cl.[7] .................................................. C08J 9/00
(52) U.S. Cl. .......................... 521/50.5; 521/77; 522/31; 522/66
(58) Field of Search ..................... 521/77, 50.5; 522/31, 522/66

(56) References Cited

U.S. PATENT DOCUMENTS 4,517,142 A * 5/1985 Baniel ........................ 264/22
5,393,641 A * 2/1995 Ito et al. ..................... 430/270
5,739,254 A * 4/1998 Fuller et al. ................. 528/125

* cited by examiner

Primary Examiner—James J. Seidleck
Assistant Examiner—Melanie D. Bagwell
(74) Attorney, Agent, or Firm—Robert D. Fish; Rutan & Tucker, LLP (57) ABSTRACT

A composition has a polymeric network that includes a porogen and a photoinitiator. The photoinitiator produces a reactive species upon irradiation, which reacts with the porogen in a degradation reaction that degrades at least some of the porogen. A method of forming a nanoporous polymer has one step in which a plurality of polymeric strands, a photoinitiator, and a porogen are provided. In a subsequent step, at least some of the polymeric strands are crosslinked to form a polymeric network that includes the porogen and the photoinitiator, and in a further step the photoinitiator in the polymeric network is irradiated to generate a reactive species that reacts with the porogen in a degradation reaction to degrade at least some of the porogen.

16 Claims, 4 Drawing Sheets

R' = aliphatic hydrocarbon with 1-6 carbon atoms, optionally halogenated, or a nitrile substituted aliphatic hydrocarbon with 1-5 carbon atoms n = greater 10, and preferably greater 50

PHOTOGENERATED NANOPOROUS MATERIALS

FIELD OF THE INVENTION

The field of the invention nanoporous polymers.

BACKGROUND OF THE INVENTION

Decreasing size and increasing density of functional elements in integrated circuits has generated a continuing demand for insulating materials with reduced dielectric constants. Among other approaches, inclusion of air into an insulating material has been successfully used to reduce the dielectric constant of the material, and various methods of introducing air into materials are known in the art.

In one method, void carriers such as hollow glass microspheres are incorporated into a polymeric matrix. For example, Yokouchi et al. teach in U.S. Pat. No. 5,593,526 a process for producing a wiring board in which hollow or porous glass spheres are covered with a ceramic coating layer, and wherein the coated glass spheres are then mixed with a glass matrix. Yokouchi's glass spheres help to reduce the dielectric constant of the wiring board, however, require coating by relatively cumbersome and expensive methods such as chemical vapor deposition, etc. Moreover, in order to create a stable structure between the glass matrix and the coated spheres, the mixture has to be fired at temperatures of about 1000° C., which is unacceptable for most, if not all integrated circuits.

In order to circumvent at least some of the problems associated with high-temperature curing, Sato et al. describe in U.S. Pat. No. 5,194,459 an insulating material that is formed from a network of hollow gas filled microspheres entrapped in a cured crosslinked fluorinated polymer network. Sato's materials dramatically reduce the temperature requirements as compared to Yokouchi's materials. Furthermore, Sato's materials can be coated onto appropriate materials in a relatively thin layer while retaining tensile strength. However, all of Sato's polymers include fluorine, which tends to reduce adhesion of the polymer to the materials employed in the fabrication of integrated circuits. Moreover, fluorine is known to cause corrosion of metal conductor lines. Still further, since the glass spheres in Sato's polymer network are not covalently bound to the surrounding network, the mechanical integrity of the porous polymer composition may be less than desirable under certain conditions.

In another method, a thermolabile component is incorporated into a polymeric material, and after curing the polymeric material, the thermolabile component is destroyed by heating. For example, Hedrick et al. describe in U.S. Pat. No. 5,776,990 blending of a thermostable polymer with a thermolabile (thermally decomposable) polymer. The blended mixture is subsequently crosslinked and the thermolabile portion thermolyzed. Blending a thermostable and a thermolabile polymer is conceptually simple, and allows relatively good control over the amount of porosity in the final polymer. However, positional control of the voids is generally difficult to achieve, and additional problems may arise where control over homogeneity and size of the voids is desirable.

Alternatively, the thermolabile portion can be grafted onto the polymeric strands. For example, block copolymers may be synthesized with alternating thermolabile blocks and thermostable blocks. The block copolymer is then heated to thermolyze the thermolabile blocks. In another approach, thermostable blocks and thermostable blocks carrying thermolabile portions can be mixed and polymerized to yield a copolymer. The copolymer is subsequently heated to thermolyze the thermolabile blocks. While incorporation of a thermolabile portion generally improves control over pore size and distribution, the synthesis of such polymers is frequently challenging.

Regardless the approach of incorporation of the thermolabile compound into the polymeric network, various difficulties still persist. Most disadvantageously, almost all polymer systems exhibit only a relatively narrow window between the curing (i.e., crosslinking) temperature of the polymeric strands and the temperature at which the thermolabile compound disintegrates. Consequently, the thermolabile compound often begins to degrade when the polymeric network is not yet sufficiently crosslinked, typically leading to pore collapse and unsatisfactory reduction in structural stability and dielectric constant.

Although various methods of generating nanoporosity are known in the art, all or almost all of them suffer from one or more disadvantages. Therefore, there is still a need to provide improved methods and compositions to generate nanoporous materials.

SUMMARY OF THE INVENTION

The present invention is directed to compositions and methods of forming nanoporous materials. In one aspect of the inventive subject matter, the composition comprises a polymeric network that includes a porogen and a photoinitiator disposed within the polymeric network. The photoinitiator produces a reactive species upon irradiation, and the reactive species reacts with the porogen in a degradation reaction that degrades at least some of the porogen.

In a preferred aspect of the inventive subject matter, the polymeric network comprises a crosslinked polymer, and it is even more preferred that the network comprises a crosslinked poly(arylene ether). Contemplated porogens comprise organic compounds, preferably oligo- or polymeric compounds, which may advantageously include acid hydrolysable groups, such as trimethylsilyl groups, t-butylcarboxy groups, or ketal groups.

In a further aspect of the inventive subject matter, the photoinitiator comprises a salt of an acid, preferably a triarylsulfonium salt of an acid, and the photoinitiator generates upon irradiation an acid as the reactive species.

In a still further aspect of the inventive subject matter, the degradation reaction comprises unmasking of a protecting group, a de-crosslinking reaction, or a fragmentation/depolymerization of a polymer.

Various objects, features, aspects and advantages of the present invention will become more apparent from the following detailed description of preferred embodiments of the invention, along with the accompanying drawing.

DETAILED DESCRIPTION

As used herein, the term "polymeric network" refers to a plurality of polymeric strands that may or may not be covalently linked together (i.e., crosslinked or cured). As further used herein, the term "polymeric strand" refers to any composition of monomers covalently bound to define a backbone, which may or may not include additional pendent functional groups or structural moieties. The term "monomer" as used herein refers to any chemical compound that is capable of forming a covalent bond with itself or a chemically different compound in a repetitive manner. Among other things, contemplated monomers may also include block polymers. The repetitive bond formation between monomers may lead to a linear, branched, super-branched or three-dimensional product. As still further used herein, the term "backbone" refers to a contiguous chain of atoms or moieties forming a polymeric strand that are covalently bound such that removal of any of the atoms or moiety would result in interruption of the chain.

Also as used herein, the term "porogen" refers to a solid or liquid compound or mixture of compounds that are substantially inert to thermal degradation at the crosslinking temperature of the polymeric strands, wherein the term "substantially inert" as used herein means that the molecular weight of the porogen after crosslinking will decrease by no more than 10% due to thermal degradation.

As further used herein, the term "photoinitiator" refers to a compound that generates a reactive species upon electromagnetic irradiation, preferably with light having a wavelength in the range of about 200 nm–600 nm. The term "reactive species" as used herein refers to any atom or molecule that is capable of reacting with the porogen in a reaction that either chemically degrades the porogen (e.g., depolymerization or fragmentation of a polymer), or alters at least one the physicochemical properties of the porogen (e.g., polarity or hydrophobicity).

Figure 1:
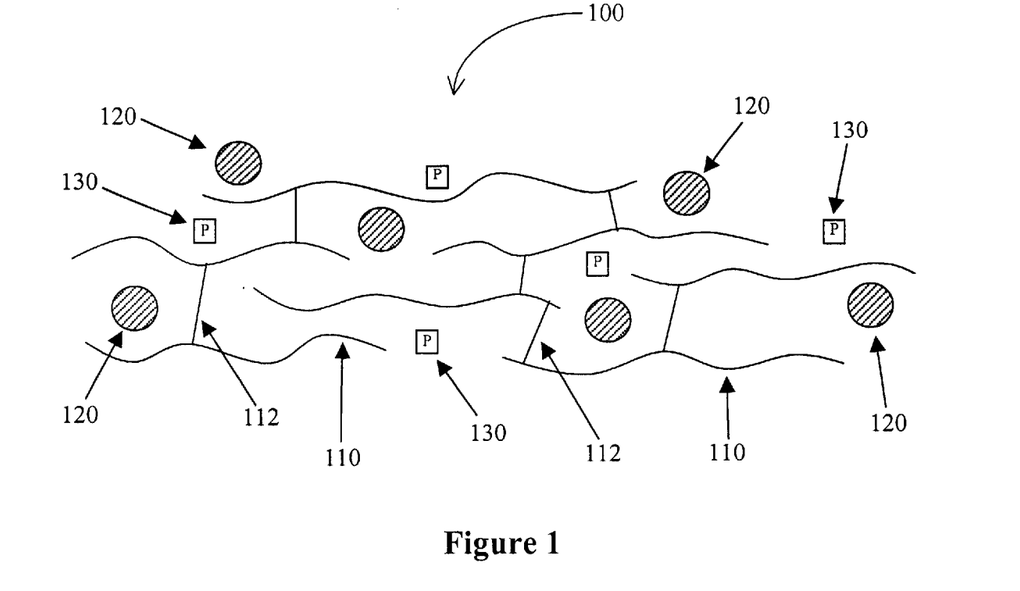
FIG. 1 is a schematic view of a composition according to the inventive subject matter.

In FIG. 1, a composition 100 has a plurality of polymeric strands 110 that are crosslinked via covalent bonds 112 to form a three dimensional polymeric network. Disposed within the polymeric network is a plurality of porogens 120 (hatched circles) and a plurality of photoinitiators 130 (squares enclosing a P).

With respect to the polymeric strands, it is contemplated that the chemical nature of the polymeric strands is not limiting to the inventive subject matter. Appropriate polymeric strands include organic and inorganic polymers, preferably organic polymers with a dielectric constant below 10, and even more preferably with a dielectric constant below 5. For example, contemplated polymeric strands may include polyesters, polycyanates, and polyethylenes, and particularly preferred polymeric strands include polyimides and poly(arylene ethers).

Figure 2:
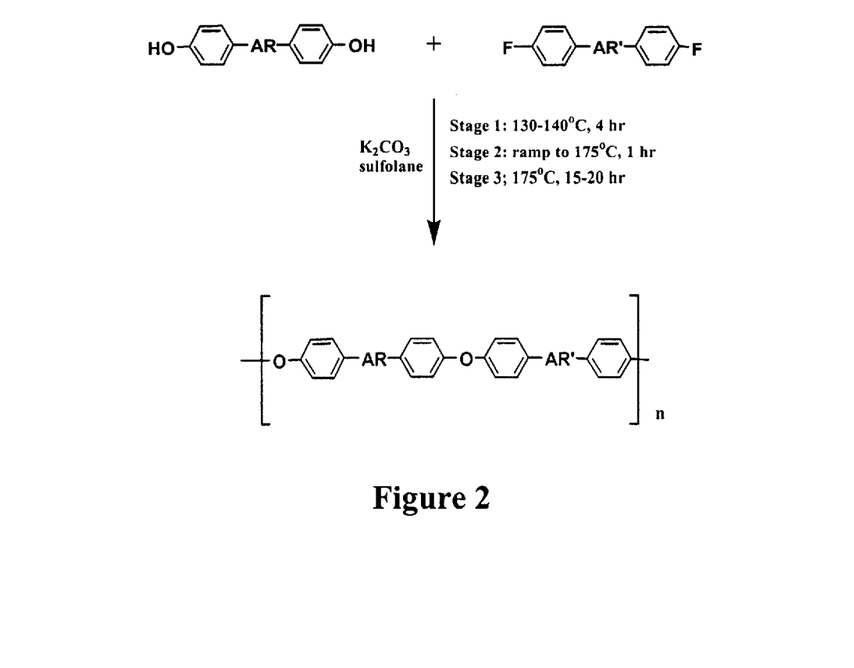
FIG. 2 is an exemplary reaction scheme for the production of a polymeric strand.
Figure 3A:
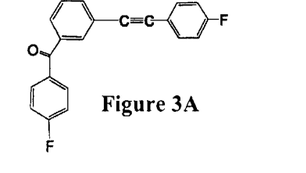
FIGS. 3A–3D are exemplary structures of difluoroaromatic compounds with a dienophile for the synthesis of the polymeric network.
Figure 3B:
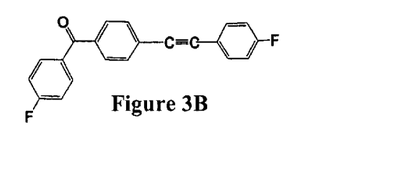
Figure 3C:
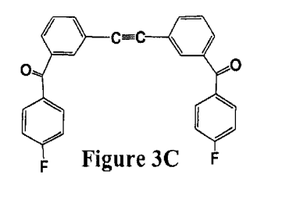
Figure 3D:
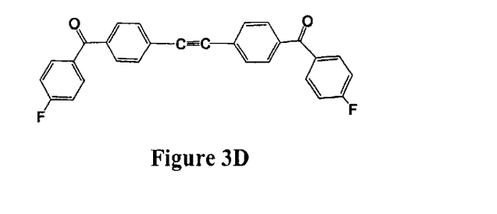

The synthesis of low dielectric constant poly(arylene ethers) is well known in the art, and an exemplary synthetic reaction scheme leading to a poly(arylene ether) is depicted in FIG. 2, wherein AR and AR' independently comprise any suitable thermally stable portion, preferably with a preponderance of aromatic or fused aromatic portions. For example, HO—$C_6H_4$—AR—$C_6H_4$—OH may be fluorene bisphenol, and F—$C_6H_4$—AR'—$C_6H_4$—F may be a difluoroaromatic compound containing at least one tolane moiety. The difluoro-compound and the bisphenolic compound are advantageously reacted in stoichiometric quantities to avoid excess unreacted monomers in the reaction mixture. In the particular example of FIG. 2, the stoichiometric quantities correspond to an equimolar mixture of the difluoro-compound and the bisphenolic compound.

It is generally contemplated that structural moieties and functional groups may be introduced into the polymeric strand by employing suitable monomers that include the desired moieties and/or groups. For example, where it is desirable that the backbone of the polymeric strand includes a dienophile or a diene, monomers as shown in FIGS. 3A–3D (with a triple bond as dienophile) and FIGS. 4A–4B (with a cyclopentadienone as diene) may be employed. Particularly contemplated monomers comprise at least two different reactive groups, and examples for such preferred monomers are depicted in FIGS. 5A–5B.

However, contemplated functional groups need not be restricted to a diene or a dienophile, but may include polar, charged, or hydrophobic groups. For example, where chemical reactivity is particularly desirable, the functional group may be an acid, acid chloride, activated ester, or a base. On the other hand, where electrostatic interactions are preferred, quaternary ammonium groups or polyphosphates may be included. Similarly, where a particular hydrophobicity or hydrophilicty is required (e.g., to achieve solubility in a particular solvent), octyl, cetyl, or polyethylene groups may be included into the polymeric strand.

With respect to structural moieties in the polymeric strand, it is particularly contemplated that appropriate structural moieties may improve physicochemical properties of the nanoporous polymer, and especially contemplated structural moieties include bulky groups to reduce the overall density of the polymeric strands, or thermolabile groups that can be thermally destroyed to create additional nanoporosity by heating. For example, bulky structures may include substantially planar moieties such as a sexiphenylene, but also include three-dimensional moieties such as adamantanes, diamantanes, or fullerenes. Furthermore, it should be appreciated that the polymeric strands according to the inventive subject matter may include adhesion enhancers (e.g., silicon-based groups), chromophores, halogens (e.g., bromine for flame retardation), etc.

Consequently, contemplated polymeric strands may have various configurations. While it is generally contemplated that polymeric strands are linear strands, alternative configurations may also include branched, superbranched, and three-dimensional configurations. For example, where particularly rigid structures are desired for crosslinked polymeric strands, the strands may include one to many branches, all of which may include reactive groups for crosslinking. On the other hand, where a relatively dense polymeric network is desired, three-dimensional polymeric strands may advantageously be employed.

The molecular weight of contemplated polymeric strands may span a wide range, typically between 400 Dalton and 400000 Dalton, or more, and particularly suitable polymeric strands are described in U.S. Patent application Ser. No. 09/538276, filed Mar. 30, 1900, and U.S. Patent application Ser. No. 09/544504, filed Mar. 6, 1900, both of which are incorporated herein by reference. However, it is generally preferred that the molecular weight will be such that flow and gap-filling characteristics are not negatively impacted. In a particularly contemplated aspect of the inventive subject matter, the polymeric strand may also be formed in situ, i.e., substantially at the same location where crosslinking of the polymeric strands will take place. For example, where the monomers are thermosetting monomers, the polymer can be formed at substantially the same location where crosslinking will occur. Especially contemplated thermosetting monomers are described in U.S. Patent application Ser. No. 09/618,945, filed Jul. 19, 1900, which is incorporated herein by reference. It should further be appreciated that in further alternative aspects, the polymeric strands need not comprise a single type of monomer, but may comprise a mixture of various non-identical monomers.

While contemplated polymeric networks need not necessarily include crosslinked polymeric strands, it is generally preferred that at least some of the polymeric strands are crosslinked via a covalent bond. Crosslinking may be performed in at least one of two conceptually different methods, all of which are contemplated suitable for use in conjunction with the teachings presented herein. In one method, crosslinking is performed by addition of an exogenously added crosslinking molecule, typically an at least bifunctional molecule, which reacts with reactive groups in the polymeric strands to form a covalent bond between the crosslinking molecule and the polymeric strands. While the reactive groups may be located in various portions of the polymeric strands (e.g., terminal position, pending, or within the backbone), it is generally preferred that the reactive groups are located within the backbone of at least a portion of the polymeric strands. In another method, crosslinking is performed without addition of exogenously added crosslinking molecules by reacting reactive groups already present in the polymeric strands to form a covalent bond between two polymeric strands. Likewise, it is contemplated that the reactive groups already present in the polymeric strands may be located in various portions of the polymeric strands (e.g., terminal position, pending, or within the backbone).

In a particularly preferred aspect of the inventive subject matter, the polymeric strands are poly(arylene ether) strands with diene and dienophile groups located within the backbones, and the crosslinking reaction is performed without addition of exogenously added crosslinker molecules in a Diels-Alder reaction between the diene and the dienophile.

With respect to the porogen, it is generally contemplated that suitable porogens comprise an organic compound, and preferably comprise an organic oligomer or polymer, so long as the porogen is substantially inert to thermal degradation at the curing temperature of the polymeric strands. For example, where the curing temperature is 320° C. or 400° C., it is contemplated that the porogen is substantially inert to thermal degradation at 320° C. or 400° C. Alternatively, where the polymeric strands are crosslinked with an exogenously added crosslinker at room temperature or relatively low temperatures (e.g., at temperatures lower than 100° C.), it is contemplated that the porogen is substantially inert to thermal degradation at the crosslinking temperature of the polymeric strands.

Figure 6:
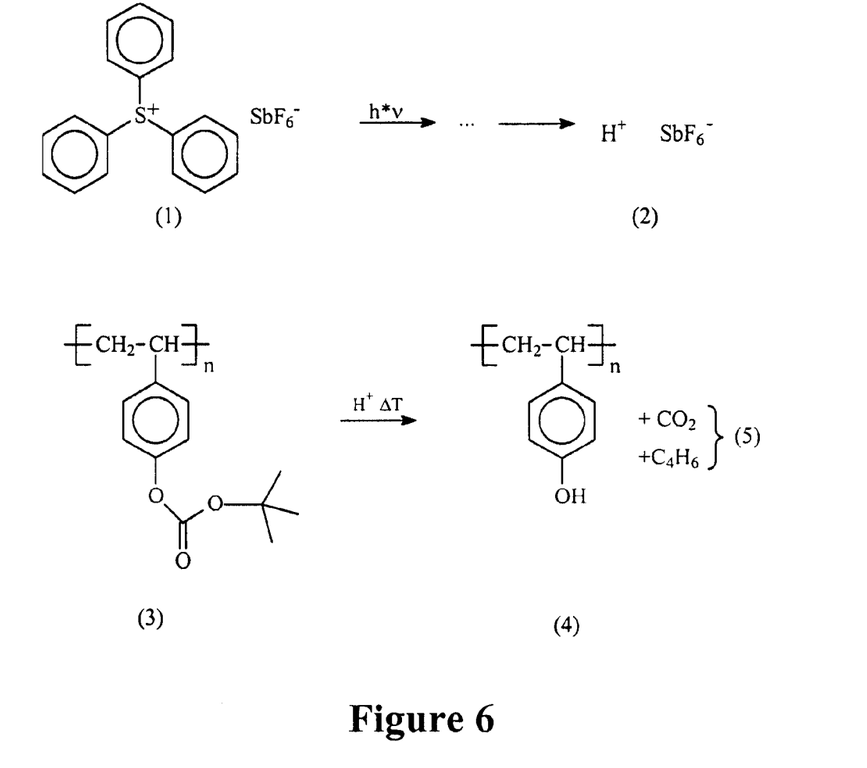
FIG. 6 is an exemplary reaction scheme for a degradation reaction of a porogen.

It is generally contemplated that the chemical nature and composition of the porogen is predominantly determined by the type of desired degradation reaction. Thus, it is particularly contemplated, that the porogen may include various functional groups, and especially contemplated functional groups include acid hydrolysable groups such as trimethylsilyl groups, t-butyl-carboxy groups, and ketal groups. For example, where the degradation reaction comprises a transformation of a molecular species insoluble in a relatively polar solvent into a molecular species that is relatively soluble in a polar solvent, the acid hydrolysable group may advantageously be a protecting group, such as a trimethyl-silyl group as depicted in FIG. 6. As presented in this figure, the photoinitiator is a triarylsulfonium salt of $SbF_6^-$ (1). In a series of UV-light induced reactions, the sulfonium cation ultimately leads to the formation of a strong Brönsted acid (2). The porogen is a poly(t-butoxycarbonyloxystyrene), a relatively non-polar polymeric compound. Upon heating under acidic condition, the tBOC (tert-butoxycarbonyl) groups pendant to the polymer chain undergo facile acid-catalyzed fragmentation, thereby producing poly (hydroxystyrene), a relatively polar polymeric compound. Further side product of this reaction are $CO_2$ and isobutylene, which are both advantageously gaseous side products.

It should be especially appreciated that the acid catalyst is regenerated upon fragmentation, and therefore a large number of poly(t-butoxycarbonyloxystyrene)groups may undergo a fragmentation reaction for each acid molecule generated. Furthermore, it is contemplated that the tBOC group may be replaced with various alternative groups, including a thermally more stable trimethylsilyl or similar group, which will also react in an acid catalyzed reaction to convert a relatively non-polar oligo- or polymeric species into a relatively polar oligo- or polymeric species. The difference in polarity in the oligo- or polymeric species can then be exploited to remove the reacted polar oligo- or polymeric species from the polymeric network.

Figure 7:
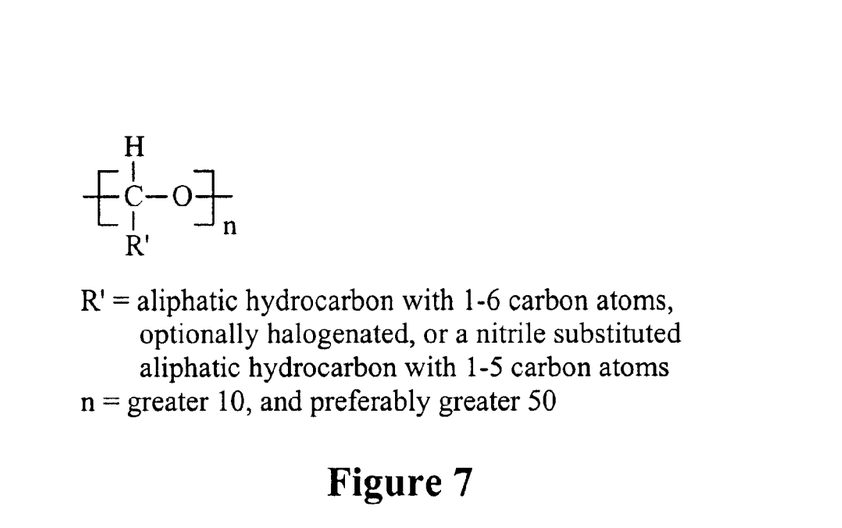
FIG. 7 is an exemplary structure for another porogen.

In another example, where the degradation reaction comprises a depolymerization of an oligo- or polymeric species, it is contemplated that the acid hydrolysable group may advantageously be a —$H_2C$—O—CH(R)— as depicted in FIG. 7. Acid catalyzed degradable polymers are well known in the art, and an example for such polymers is described in U.S. Pat. No. 3,917,483 to Limburg et al., which is incorporated by reference herein. It should be appreciated, however, that many porogens other than the above mentioned exemplary porogens are contemplated, and suitable porogens may include alkyl esters of polyvinyl alcohol, 2-oxiranyloxypolystyrene, or t-butylpolymethacrylate. Further examples for suitable porogens may be found in "Lithographic Resists", Supplement 1 to Kirk-Othmer Encyclopedia of Chemical Technology).

With respect to the photoinitiator, it is contemplated that all molecules that yield a reactive species upon irradiation are appropriate, and particularly preferred photoinitiators include those who generate an acid or a base as the reactive species upon preferably ultraviolet irradiation. There are many photoinitiators known in the art and all of the known photoinitiators are contemplated suitable, so long as contemplated photoinitiators generate a reactive species upon irradiation at a wavelength that is not substantially similar (i.e., within 10–15% deviation from $\lambda_{max}$ of the absorption maximum) to the absorption maximum of the oligomeric or polymeric species, and so long as the photoinitiator is substantially stable at the crosslinking temperature of the polymeric strands. Table 1 illustrates exemplary known photoinitiators and some of their physicochemical properties.

| Photoinitiator | $\lambda_{max}$ of Photoinitiator | Reactive species generated |
|---|---|---|
| $(C_6H_5)_3S^+$ $SbF_6^-$ | 250–350 nm | $HSbF_6$ |
| $[(CH_3)_3C$—$C_6H_4]_2I^+$ $CF_3SO_3^-$— | 250–350 nm | $CF_3SO_3H$ |
| 2,6-$(NO_2)$—$C_6H_4$— | 250–350 nm | $CF_3CO_2H$ |

-continued

| Photoinitiator | $\lambda_{max}$ of Photoinitiator | Reactive species generated |
|---|---|---|
| CH$_2$OCOCF$_3$ Thioxanthonelamine mixture | 300 nm | amine derived radical |

While contemplated photoinitiators may be generally be a salt of an organic or an inorganic acid, it is preferred that the photoinitiator is a salt of an inorganic acid due to their higher thermal stability. It is still further contemplated that the photoinitiator may also be converted into a reactive species by irradiation.

Consequently, the reactive species may vary substantially, and the specific reactive species used in any particular embodiment will generally depend on the chemical nature of the photoinitiator. However, it can be said that especially preferred reactive species include acids and bases, and it is even more preferred that the photogenerated acids are inorganic acids. For example, where the photoinitiator is a triarylsulfonium salt of SbF$_6^-$, the corresponding inorganic acid will be HSbF$_6$.

Figure 8:
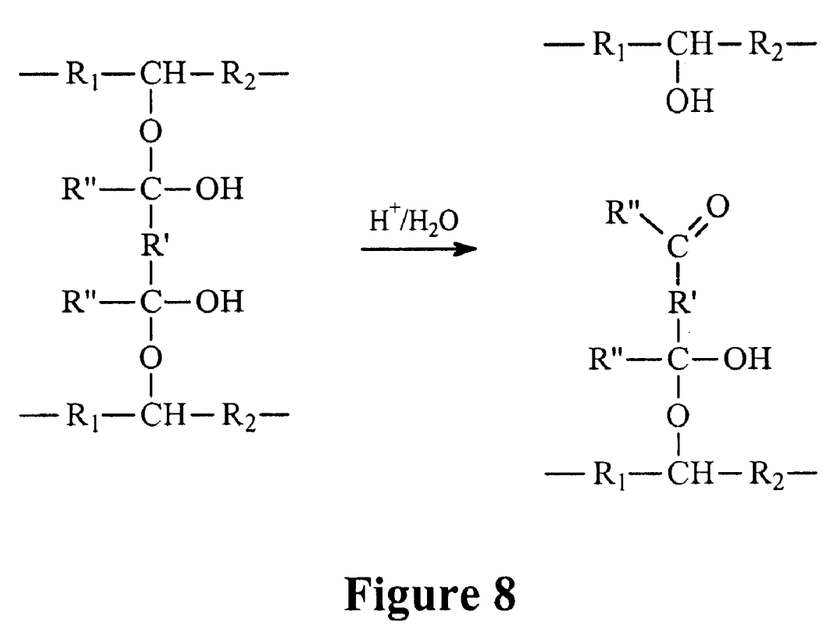
FIG. 8 is an exemplary reaction scheme for a degradation reaction of a further porogen.

Therefore, depending on the chemical nature of the porogen and the photoinitiator, the degradation reaction may vary considerably. However, particularly contemplated degradation reactions include (1) an unmasking of a protecting group, (2) a de-crosslinking reaction, and (3) a depolymerization or fragmentation of an oligomeric or polymeric species. For example, where removal of the porogen with a solvent is particularly desirable, deprotection of silyl or other groups are especially contemplated in which the protected silyl or other group is relatively non-polar, and the deprotected silyl or other group is relatively polar (supra). On the other hand, where a change in polarity can not be effected with a suitable solvent system or deprotection reaction, it is especially contemplated that the molecular weight of a crosslinked oligomeric or polymeric species is reduced by de-crosslinking. Particularly preferred de-crosslinking reactions are acid catalyzed, and suitable de-crosslinking reactions may include acid catalyzed cleavage of a ketal-type covalent bond as depicted in an exemplary de-crosslinking reaction shown in FIG. 8. Here, two polymeric strands are covalently crosslinked with an exogenously added crosslinker, and the strands are covalently coupled to the crosslinker via two ketal groups. In an acid catalyzed reaction at least one of the ketal groups is hydrolyzed, and the polymeric strands are separated. Acid catalyzed hydrolysis of hemi-ketal or ketal groups is well known in the art, and exemplary reaction conditions can be found, e.g., in Organic Syntheses, Vol 3, p. 502 (1955) In still further alternative aspects of the inventive subject matter, it is contemplated that the photogeneration of a reactive species need not necessarily rely on the generation of catalytic quantities of an acid by a photoinitiator. In fact, it is contemplated that all know photoresists, and especially negative photoresist, may be employed in conjunction with the teachings presented herein. There are many photoresists known in the art, and exemplary suitable photoresists are described in U.S. Pat. No. 4,614,703 to Guillet et al. (acid degradable polymer) and U.S. Pat. No. 5,304,456 to Ueda et al. (base degradable polymer). While many photoresists are commercially available in a film format, it is preferred that contemplated photoresists have a shape other than a film, and particularly preferred shapes include granules and microspheres with an average diameter of preferably less than 100 µm, more preferably less than 1 µm, and most preferably less than 50 nm.

In yet further aspects of the inventive subject matter, a method of forming a porous material has a step in which a plurality of polymeric strands, a photoinitiator, and a porogen are provided. In a further step, at least some of the polymeric strands are crosslinked to form a poly-meric network that includes the porogen and the photoinitiator; and in yet another step, the photoinitiator in the polymeric network is irradiated to generate a reactive species that reacts with the porogen in a degradation reaction that degrades at least some of the porogen.

With respect to the amounts of porogen and photoinitiator in the polymeric network it is contemplated that appropriate amount may vary considerably depending on the desired porosity and type of degradation reaction. For example, where a relatively high degree of nanoporosity is desired, the porogen may be present in the polymeric network in an amount of about 15 wt % to 35 wt % (relative to the weight of the polymeric network), and more. On the other hand, where only relatively low degrees of nanoporosity are preferred, the porogen may be present in the polymeric network in an amount of about 1 wt % to 5 wt %, and less. Similarly, where the degradation reaction includes a radical reaction or an acid catalyzed reaction, it is contemplated that the amount of photoinitiator relative to the weight of the polymeric network may be between less than 0.01 wt % and 5 wt %, and more. On the other hand, where stoichiometric amounts of the reactive species are required (e.g., acid hydrolysis of a covalent crosslink), the photoinitiator may be present in an amount of about 1–5 wt % to 35 wt %, and more.

Since it is generally desired that a method according to the inventive subject matter will result in a nanoporous material, it is preferred that the degraded porogen is at least partially removed from the polymeric network. Especially preferred methods of removing partially or fully degraded porogen include leaching, dissolving or otherwise liquefying the degraded porogen, and thermal degradation (e.g., pyrolysis of a poly(lactate)).

Consequently, it is contemplated that methods and compositions according to the inventive subject matter are especially suitable for use in low-dielectric constant insulating layers in microelectronic devices. For example, contemplated compositions may be spin-coated onto the surface of a silicon wafer, cured at the curing temperature, and subsequently irradiated with light of appropriate energy to at least partially degrade the porogen. The at least partially degraded porogen may then be removed by various methods to create a nanoporous material. Thus, where a spherical porogen has an average diameter of about 100 nm, it is contemplated that the corresponding void will have substantially the same dimensions (i.e., shape and diameter). The voids generated according to the contemplated methods may thereby be gas filled (e.g., air, argon, CO$_2$, etc.), and may or may not contain residual porogen. It should be particularly appreciated that by employing a porogen with a thermal stability higher than the curing temperature of the polymeric strands, rigorous crosslinking can be performed while maintaining the structural integrity of the porogen. After sufficient crosslinking, the photoinitiator is irradiated and generates a reactive species that assists (e.g., catalytically) in the degradation of the porogen, thereby allowing to create pores without increasing the propensity of the nanoporous material to collapse due to insufficient crosslinking.

EXAMPLE

The following examples illustrate an exemplary synthesis of polymeric compositions according to the inventive subject matter.

Synthesis of the Polymeric Network from Poly(arylene ether)

A general synthetic procedure for the nucleophilic aromatic substitution is exemplified in the reaction scheme shown in FIG. 2, and can be performed as a reaction between fluorene bisphenol and 4-fluoro-3'-(4-fluorobenzoyl)tolane: 1L 3-neck RB flask, equipped with an magnetic stirrer, a thermocouple, a Dean-Stark trap, a reflux condenser and $N_2$ inlet-outlet connection is purged by $N_2$ for several hours and fed with 0.2L warm sulfolane. At 70–80° C., 0 35.042 g (0.1000 Mol) of fluorene bisphenol (FBP), 31.8320 g (0.1000 Mol) of 4-fluoro-3'-(4-fluorobenzoyl)-tolane (FBZT) and 27.64 g (0.2 Mol) of Potassium carbonate are added and rinsed by 165 mL of warm sulfolane and 165 mL of toluene. The reaction mass is heated to 140° C. and azeotroped at this temperature for 1–2 hours, then temperature is gradually raised to 175° C. by removing of toluene and reaction is continued at 175° C. with azeotroping during 15–20 h. The temperature is reduced to 165° C., 4-fluorobenzophenone is added and end-capping is continued for 5 hours. The reaction mass is diluted with 165 mL of NMP and left overnight. Then cold reaction mass is filtered through paper filter, precipitated in 5×MeOH (0.03% $HNO_3$), redisolved in NMP and reprecipitated in 5×MeOH (0.01% $HNO_3$). The precipitate is filtered using paper filter, washed on filter 3 times each with 1L of MeOH and dried in vacuum oven for overnight at 60°–70° C.

Figure 4A:
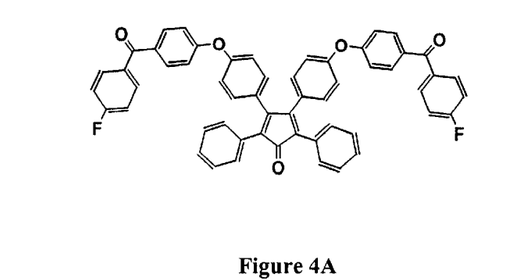
FIGS. 4A–4B are exemplary structures of difluoroaromatic compounds with a diene for the synthesis of the polymeric network.
Figure 4B:
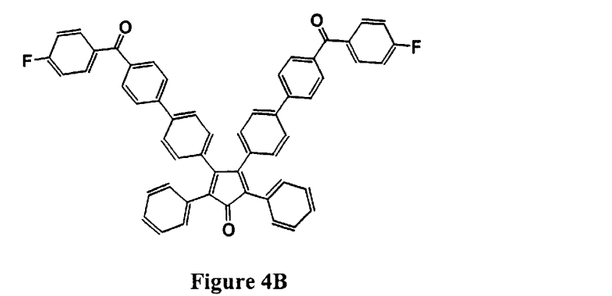
Figure 5A:
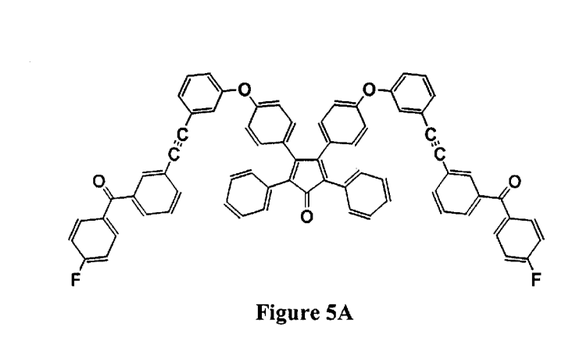
FIGS. 5A–5B are exemplary structures of difluoroaromatic compounds with a diene and a dienophile for the synthesis of the polymeric network.
Figure 5B:
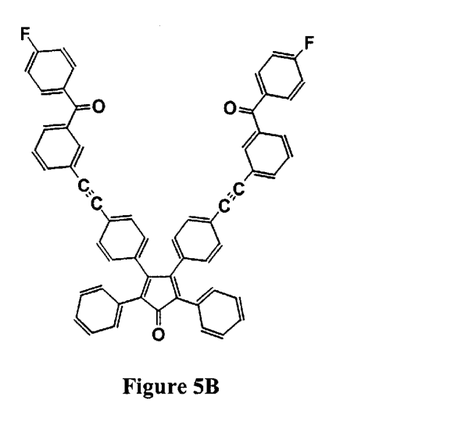

For the formation of polymeric strands including both a diene and a dienophile, a portion (e.g., 50 mol %) of the 4-fluoro-3'-(4-fluorobenzoyl)-tolane (i.e., the dienophile bearing monomer) is replaced with a difluoro-component as depicted in FIGS. 4A and 4B (i.e., a diene bearing monomer). Alternatively, all of the 4-fluoro-3'-(4-fluorobenzoyl)-tolane can be replaced with a difluoro-component as depicted in FIGS. 5A and 5B to impart both the diene and dienophile component in a single monomer.

The resulting polymeric strands are dissolved in NMP to a desired concentration, typically between 2 wt % and 20 wt %. To this solution is added approximately 0.2 wt % of $(C_6H_5)_3S^{+SbF_6^-}$ as photoinitiator and about 2 wt % of poly(t-butoxycarbonyloxystyrene) as porogen. The porogen is in the shape of micro-spheres with an average diameter of 100 μm formed from solid poly(t-butoxycarbonyloxystyrene) by methods well known in the art.

Crosslinking of the Polymeric Network

The resulting solution of polymer, porogen and photoinitiator is applied onto an appropriate surface, preferably the surface of a silicon wafer with a plurality of integrated circuits by methods well known to the art. A particularly preferred method is spin coating, however, many alternative methods such as doctor blading or dip-coating are also considered appropriate. For the crosslinking reaction of the polymeric strands via the diene and dienophile groups in the backbone of the polymeric strands, the coated wafer is heated up to 400° C. for about 90 min in an inert atmosphere (e.g., in argon or nitrogen). While the polymeric strands undergo a thermally activated crosslinking reaction to form a crosslinked polymeric network, the photoinitiator and the porogen remain substantially stable at the curing temperature.

Irradiation to Generate Reactive Species and Degradation Reaction

The cured film on the silicon wafer is irradiated at room temperature for approximately 90 seconds with polychromatic UV light at a wavelength of about 200 nm–260 nm, and the irradiated wafer is subsequently heated to about 160° C. for a time sufficient to degrade at least part of the porogen (typically no less than 20 min). During the acid catalyzed reaction between the photogenerated acid and the porogen, the poly(t-butoxycarbonyloxystyrene) will be catalytically converted to poly(hydroxystyrene), which can subsequently be removed by rinsing the irradiated and heated waver with a polar solvent.

It is contemplated that the so fabricated polymeric materials exhibit pores corresponding in size to the porogen micro-spheres, thereby introducing nanoporosity into the polymeric composition. Depending on the polymeric strands employed in the polymeric materials, it is contemplated that the nanoporous polymeric materials will have a glass transition temperature Tg of higher than 350° C., more preferably higher than 400° C. and most preferably higher than 420° C. (e.g., Tg of selected poly(arylene ethers) is generally higher than 400° C.). Likewise, it is contemplated that the dielectric constant of nanoporous polymeric materials fabricated according to the inventive subject matter will predominantly depend on the dielectric constant of the polymeric network and the amount of air enclosed in the polymeric network. The following formula can be employed to calculate the dielectric constant of a material:

$$\epsilon_0 = (\epsilon_1 * \epsilon_2)/(\epsilon_1 V_2 + \epsilon_2 V_1)$$

wherein $\epsilon_0$ is the dielectric constant of the nanoporous polymer, $\epsilon_1$ is the dielectric constant of the solid first and second polymeric strands, $\epsilon_2$ is the dielectric constant of air, $V_1$ is the volume of the dielectric with the constant $\epsilon_1$ (in a fraction of 1, i.e., a porosity of 30% equals V=0.3), and $V_2$ is the volume of the dielectric with the constant $\epsilon_2$ (also in a fraction of 1). Nanoporous polymers produced according to the inventive subject matter are contemplated to have a dielectric constant k of no more than 2.5, and more preferably of no more than 2.1. For example, where a poly(arylene ether) as described above with a dielectric constant of approximately 2.9 is employed in a nanoporous polymer according to the inventive subject matter, and where the nanoporous polymer has an air content of 30% (with the dielectric constant of air being 1.0), the resulting dielectric constant for the nanoporous polymer is 1.85. Consequently, where the porosity is greater than 30%, it is contemplated that k-values of no more than 2.1, and less can be achieved.

Thus, specific embodiments and applications of photogenerated nanoporous materials have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A composition of matter comprising:
    a polymeric network that includes a porogen comprising an organic compound and a photoinitiator, wherein the polymeric network comprises a crosslinked polymer formed by a Diels-Alder reaction;

wherein the photoinitiator produces a reactive species upon irradiation by an irradiation source; and wherein the reactive species is reactive with the porogen in a degradation reaction that degrades at least some of the porogen.

2. The composition of claim 1 wherein the polymer comprises a poly(arylene ether).

3. The composition of claim 1 wherein the organic compound comprises at least one of an oligomer and a polymer.

4. The composition of claim 1 wherein the organic compound comprises an acid-hydrolysable group.

5. The composition of claim 4 wherein the acid-hydrolysable group is selected from the group consisting of a trimethylsilyl group, a t-butylcarboxy group, and a ketal group.

6. The composition of claim 1 wherein the photoinitiator comprises a salt of an acid.

7. The composition of claim 6 wherein the salt comprises a triarylsulfonium ion.

8. The composition of claim 1 wherein the reactive species comprises an acid.

9. The composition of claim 1 wherein the degradation reaction comprises an unmasking of a protecting group.

10. The composition of claim 1 wherein the degradation reaction comprises a de-crosslinking reaction.

11. The composition of claim 1 wherein the degradation reaction comprises at least one of a depolymerization of a polymer and a fragmentation of a polymer.

12. A method of forming a porous material, comprising:
providing a plurality of polymeric strands, a photoinitiator, and a porogen;

crosslinking at least some of the plurality of the polymeric strands to form a polymeric network that includes the porogen and the photoinitiator; and irradiating the photoinitiator in the polymeric network to generate a reactive species that reacts with the porogen in a degradation reaction that degrades at least some of the porogen, wherein the step of crosslinking couples at least two of the plurality of the polymeric strands without involvement of any exogenously added crosslinking molecule and wherein a first polymeric strand has a first backbone with a first reactive group, and a second polymeric strand has a second backbone with a second reactive group, and wherein the step of crosslinking comprises a Diels-Alder reaction between the first and the second reactive groups.

13. The method of claim 12 further comprising the step of removing at least some of the degraded porogen from the polymeric network, thereby creating a plurality of voids.

14. The method of claim 12 wherein the plurality of the polymeric strands comprise a poly(arylene ether).

15. The method of claim 12 wherein the porogen comprises an organic compound with at least one acid-hydrolysable group.

16. The method of claim 12 wherein the photoinitiator comprises a salt of an acid.

* * * * *